Patented Feb. 2, 1954

2,668,138

UNITED STATES PATENT OFFICE 2,668,138

FOAM DEPRESSANT

John J. Walker and John E. Farbak, Chicago, Ill., assignors to Swift & Company, Chicago, Ill., a corporation of Illinois No Drawing. Application May 10, 1950,
Serial No. 161,249

5 Claims. (Cl. 195—107)

The present invention relates in general to defoaming, and more particularly to a novel defoaming composition and process especially adapted to suppress the formation of foam in aqueous systems.

Many substances have a tendency to foam during heating or other processing, and a large number of agents or compositions have hitherto been proposed to combat such tendency. For example, in the manufacture of antibiotics such as penicillin or streptomycin, foaming of the aqueous broth in the fermentation tanks results in a considerable decrease in yield unless controlled by a suitable defoaming agent. One disadvantage of the majority of the prior art defoamers has been the cost and relative difficulty in obtaining sufficient quantities of the defoaming composition. It has now been found that a very excellent defoaming composition may be obtained as a by-product of the refining of fatty materials.

In the refining of fatty materials, such as animal fats, by counter-current extraction or fractionation with propane or the like, the residue or extract from such operation may be referred to as "ebony fat" and resembles ordinary pitch in color and consistency. We have found from an efficiently operated extraction unit of this type wherein the fatty material treated has not been alkali refined, the residue contains such small amounts of oil, phosphatides and free fatty acids that it is uneconomical to recover such materials therefrom, and the residue would normally be discarded. It has been discovered, however, that this residue, particularly when admixed with suitable oils, has unusual properties as a defoaming agent in aqueous systems.

It is, therefore, an object of this invention to provide novel defoaming compositions.

It is a further object of this invention to provide a process for controlling foam in fermentation processes.

It is an additional object of the present invention to provide a means of utilizing the "ebony fat" derived from the liquefied, normally gaseous, hydrocarbon decolorization of fatty materials.

Another object of this invention is to provide a process for controlling foam in penicillin fermentations.

Additional objects if not specifically set forth herein will be readily apparent to one skilled in the art from the following detailed description of the invention.

The basic component of the novel defoaming composition disclosed herein may be obtained as a by-product of the solvent decolorization of fatty materials, such as edible and inedible animal fats, tallows and vegetable oils, and the like. The product is preferably obtained by passing the fatty material in counter-current relationship with a liquefied, normally gaseous hydrocarbon such as propane, in a column maintained under relatively high temperatures and pressures. The pressures and temperatures in the column, when propane is used, are generally in the range of from 170° to 185° F. and from 400 to 530 p. s. i. The ratio of propane to fatty material is about 15 to 1 to 30 to 1. Under these conditions, a separation of phases occurs in the column, the heavier phase or extract comprising a solution of the color bodies and other residue and the lighter phase or raffinate comprising a solution of the decolorized material, the ratio of the heavier phase to the lighter phase being about 1:40. The heavier material is separated, the propane recovered therefrom and the resulting viscous material, designated as "ebony fat," is the basic material utilized in the present invention.

The fatty material treated with the solvent may be crude or unrefined oils, or it may be a refined oil, for example, an oil treated with an alkali such as aqueous caustic soda. If the fatty material treated with the solvent is unrefined, then it may be desirable to treat the extract with an alkali. The alkali treatment whether applied to the charge oil or to the extracted material removes such materials as fatty acids and phosphatides.

The composition of the "ebony fat" has never been completely determined, but it is known to contain a number of complex chemical compounds, the exact structure and composition of which are unknown.

In accordance with the present invention it has been found that when properly handled the "ebony fat" has great value and utility as a defoaming agent. Small quantities of this material, blended with animal, vegetable or mineral oils, show remarkable foam-abating properties, particularly in processes involving fermentation, such as the production of yeast, riboflavin, and antibiotics, such as penicillin, streptomycin and the like.

The following examples are merely for the purpose of illustration and are not intended to limit the scope of this invention thereby:

*Example I*

A mixture of 50% mineral oil and 50% "ebony fat" obtained as a residue from the counter-current propane extraction of tallow were mixed together. The defoamer sample was then rested against foam produced in a 1% lactose, 1% cornsteep liquor solution in the following manner: 300 cc. of the aqueous broth were added to a 3 inch glass cylinder having a cylindrical carborundum air disperser at the bottom thereof. Finely dispersed air was passed through the liquid, and the foam volume, recorded after two minutes, was found to be 2880 cc. This test was repeated, adding 0.03% of the defoamer sample to another 300 cc. portion of the broth, after testing the broth in the cylinder for 1 minute to insure that it foamed properly before the defoamer was added. The foam volume after two minutes was now found to be only 1150 cc.

*Example II*

The above treatment was repeated, this time utilizing as a defoamer a sample prepared by admixing 50% mineral oil with 50% of the "ebony fat" from the same source as above, but which had been alkali-refined after recovery from the tallow extraction unit to remove any free fatty acids or phosphatides which might have been present. The foam volume after two minutes without the defoamer present was 2685 cc. The foam volume using 0.03% of the defoamer sample added was only 1155 cc.

*Example III*

Tests similar to Examples I and II were carried out on a sample of "ebony fat" obtained from a subsequent tallow extraction and the following results recorded:

| | Foam volume, no defoamer | Foam volume 0.03% defoamer added |
|---|---|---|
| | Cc. | Cc. |
| A. 50% mineral oil plus 50% "ebony fat" | 3,700 | 1,050 |
| B. 50% mineral oil plus 50% alkali-refined "ebony fat" | 3,650 | 975 |

The tests disclosed in Examples I–III above, were conducted with a constant rate of air-flow throughout, the defoamer temperature was maintained at 80° F. in each case, and the cylinder used was cleaned thoroughly with soap and water and then rinsed with acetone and water between each test.

*Example IV*

The following data was recorded during commercial production of penicillin, using as a defoamer a mixture of approximately ⅓ "ebony fat" and ⅔ grease oil: cornsteep media was used for fermentation; the defoamer was added as needed during the fermentation, requiring about 0.1% by weight of defoamer added to control the foam produced; thirty-nine fermentations were made and it was found that by using the defoamer of this invention an increase in yield (over the yield obtained with conventional defoamers) of 20% was obtained.

*Example V*

During the production of riboflavin, 25 gallons of a defoamer made up from 50% "ebony fat" and 50% mineral oil were added to a 20,000 gallon fermentor containing a barley-cornsteep solution. No additional defoamer was required during the fermentation period of three days.

*Example VI*

In the production of streptomycin, 30,000 gallon fermentors are used. During the 3-day fermentation period, employing cornsteep solution, the defoamer of Example V was added as required. The amounts of defoamer necessary to control foaming ranged around 0.1–0.2% by weight.

*Example VII*

During the production of yeast, 30,000 gallon fermentors containing a cornsteep molasses solution were used. 40 to 60 pounds of the defoamer of Example IV were used to control foam over a 2-day fermentation period, the defoamer being added as needed.

Although it is within the applicants' broad invention to use the "ebony fat" as a defoamer alone, it is advisable from a practical standpoint to mix or blend the "ebony fat" with an animal, vegetable, or mineral oil or combinations thereof in order to decrease the viscosity of the defoaming composition. The straight "ebony fat" is very viscous and has been found to be very surface-active. "Ebony fat" will emulsify with water, for example, holding as much as 40% water in emulsion form. The defoaming compositions as disclosed herein have been found to be non-toxic in penicillin, streptomycin, yeast and riboflavin fermentations and in the case of penicillin production, a considerable increase in yield over that obtained with conventional defoamers was noted (see Example IV).

The invention is considered to cover both the combination of straight "ebony fat" with an animal, vegetable, or mineral oil or mixtures thereof, and the combination of "ebony fat" which has been alkali-refined with such oils or mixtures of oils, together with the use of the straight or alkali-refined "ebony fat" above as a defoamer. The kind of oil used as a diluent or carrier is unimportant except that it must reduce the viscosity of the extract.

The following compositions have been found to provide good defoaming action in accordance with the present invention:

A. 100% "ebony fat"
B. 50% "ebony fat" plus 50% mineral oil
C. 50% "ebony fat" plus 25% mineral oil plus 25% No. 1 lard oil
D. 50% "ebony fat" plus 45% mineral oil plus 5% monoglycerides
E. 33⅓% "ebony fat" plus 66⅔% prime burning oil
F. 50% "ebony fat" plus 50% prime burning oil
G. 50% "ebony fat" plus 50% No. 1 lard oil
H. 50% "ebony fat" plus 50% extra winter strained oil
I. 50% "ebony fat" plus 45% extra winter strained oil plus 5% monoglycerides
J. 50% "ebony fat" plus 50% soybean oil
K. 50% "ebony fat" plus 50% peanut oil The term "ebony fat" as used in the specification and appended claims is understood to specify the residue remaining after the extraction of fatty materials with a liquefied, normally gaseous hydrocarbon such as propane in the manner aforesaid.

The term "normally gaseous hydrocarbon" is intended to mean primarily propane and butane, although other hydrocarbons of lower or higher boiling point, such as ethane and pentane, may be present in commercial products.

Obviously, many modifications and variations

We claim:

1. A process for the suppression of foam in a fermentation process which comprises incorporating into the material undergoing fermentation a small but sufficient quantity of the complex compounds obtained as the residue from the high-temperature, counter-current extraction of fatty materials with liquefied propane.

2. A defoaming composition for fermentation processes comprising a mixture of the complex compounds obtained as the residue from the propane decolorization of fatty materials as the active defoaming agent, together with a small but sufficient amount of a carrier to reduce the viscosity of said complex compounds selected from the group consisting of animal, vegetable, mineral oils and mixtures thereof.

3. A composition as in claim 2 wherein the ratio of defoaming agent to mineral oil is 1 to 1.

4. A composition as in claim 2 wherein the ratio of defoaming agent to animal oil is 1/3 to 2/3.

5. A process for the suppression of foam in a fermentation process which comprises incorporating into the material undergoing fermentation a small but sufficient amount of a mixture of the complex compounds obtained as the residue from the high-temperature, counter-current extraction of fatty materials with liquefied propane as the active defoaming agent, and an oil selected from the group consisting of animal, vegetable, mineral oils and mixtures thereof as a viscosity-reducing agent for said complex compounds.

JOHN J. WALKER.
JOHN E. FARBAK.

References Cited in the file of this patent

UNITED STATES PATENTS

| Number | Name | Date |
|---|---|---|
| 1,792,963 | Boye | Feb. 17, 1931 |
| 2,085,709 | Steibelt | June 29, 1937 |
| 2,423,214 | Wells | July 1, 1947 |
| 2,523,245 | Coppock | Sept. 19, 1950 |